United States Patent

[11] 3,545,602

[72] Inventor Morris Behan McCullagh
 23 Wallaroy Road, Double Bay, New South Wales, Australia
[21] Appl. No. 754,212
[22] Filed Aug. 21, 1968
[45] Patented Dec. 8, 1970
[32] Priority Aug. 23, 1967
[33] Australia
[31] No. 26,325

[54] BELT CONVEYORS HAVING WING ROLLERS
 4 Claims, 3 Drawing Figs.
[52] U.S. Cl. .................................................. 198/192
[51] Int. Cl. ............................................. B65g 15/08
[50] Field of Search .................................. 198/192, 202

[56] References Cited
UNITED STATES PATENTS
2,249,588 7/1941 Waddle ....................... 198/204

Primary Examiner—Richard E. Aegerter
Attorney—Waters, Roditi, Schwartz & Nissen

ABSTRACT: A belt conveyor has central belt support rollers and wing rollers on each side of the central rollers, a continuous being supported as a trough on the rollers. Sheet steel members are provided on each side of the conveyor which act both as windshields and as structural elements of the conveyor, supporting the outside ends of the wing rollers and also providing runways for a servicing trolley or for transporting sections of the conveyor during its construction. The distance between the supporting uprights can be increased considerably, and the windshield constructional elements can be made in lengths of 60 feet or more, and such that they can be nested for transportation.

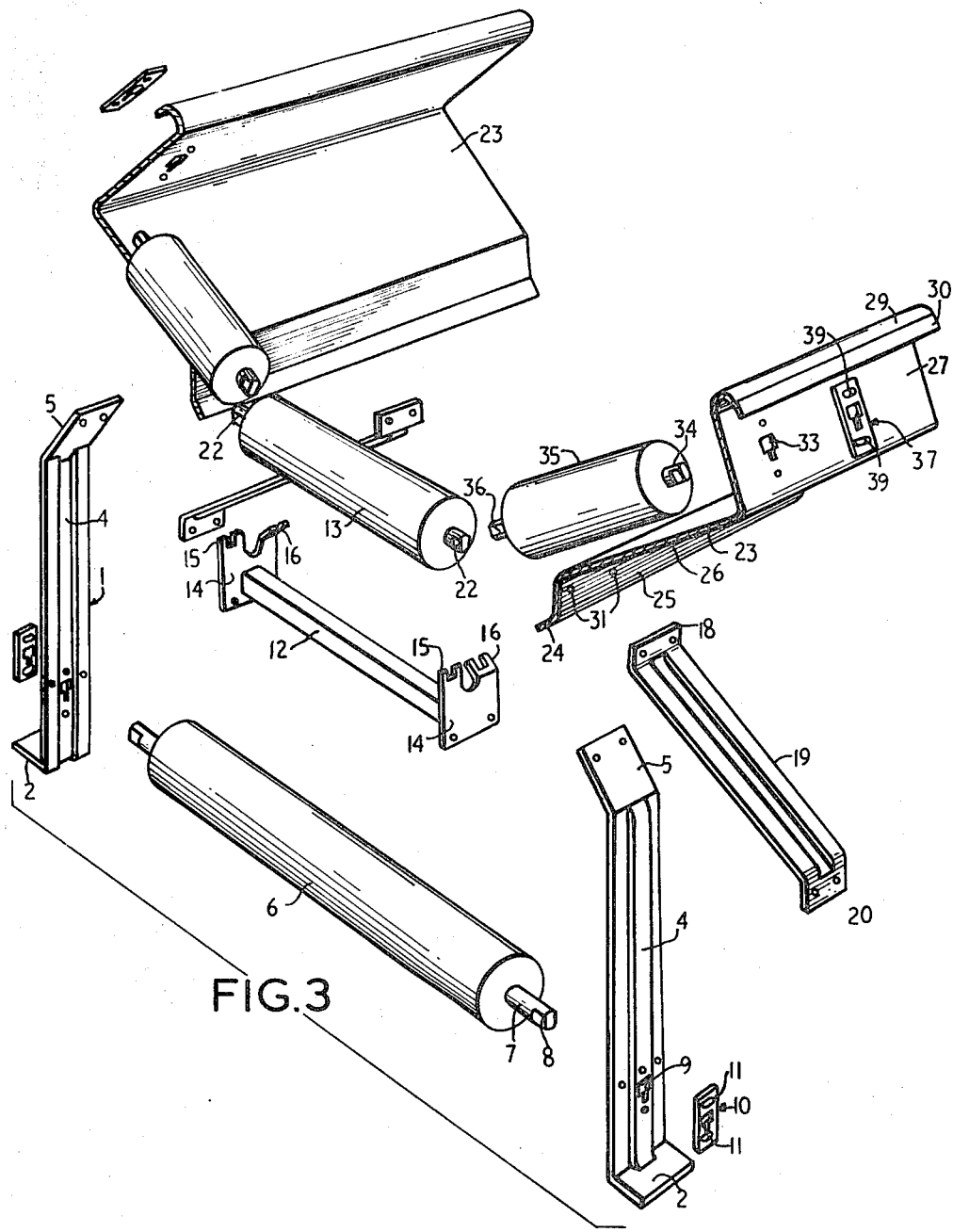
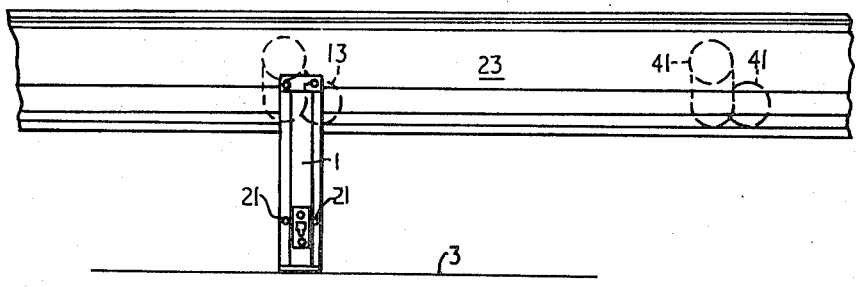
FIG.3
FIG.1

3,545,602

BELT CONVEYORS HAVING WING ROLLERS

This invention relates to belt conveyors having central belt support rollers and wing rollers on each side of the central rollers, a continuous belt being supported as a trough on the rollers.

BACKGROUND OF THE INVENTION

The present practice with belt conveyors of this type, if windshields are used, is to first construct the conveyor, and then bolt the windshield panels onto the conveyor. This practice is time consuming and wasteful, and necessitates supporting uprights at short intervals. Special provision must be made if a trackway over the conveyor is required.

SUMMARY OF THE INVENTION

The present invention is directed to integrating the windshield into the conveyor design and using it as a constructional element, resulting in an economical and efficient design.

In accordance with the invention, a belt conveyor of the type having central belt support rollers and wing rollers on each side is characterized in that a sheet steel member is provided on each side of the conveyor, each said sheet steel member acting as a windshield and providing a support for the outer ends of the shafts of wing idler rollers.

BRIEF DESCRIPTION OF THE DRAWINGS

FIG. 1 is a side elevation of a short length of the conveyor according to the invention;

FIG. 3 is an exploded perspective view of a short length of the conveyor.

Figure 2:
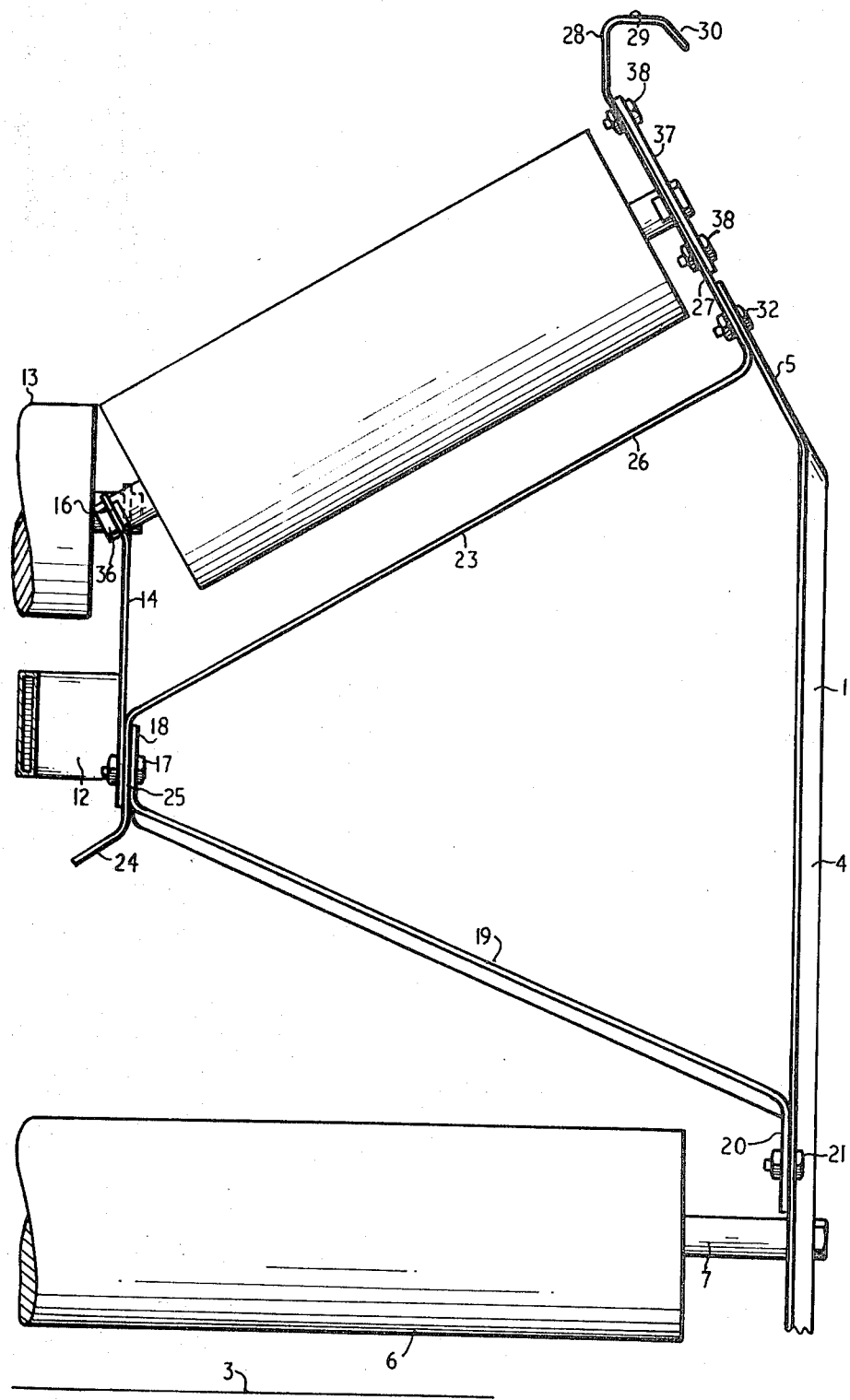
FIG. 2 is a section across the right-hand side of the conveyor of FIG. 1, to a larger scale than in FIG. 1.

The conveyor belt itself is not shown in the drawings.

DETAILED DESCRIPTION

Referring now to the drawings, steel uprights or trestles 1 are provided on each side of the conveyor at spaced intervals, for example at intervals of 12 feet, and ultimately carry the weight of the conveyor and its load. Each upright 1 may have a horizontal foot 2 by which it may be bolted to a concrete or other support 3, and its vertical face may have one or more longitudinal reinforcing ribs 4. The upper end 5 of each upright is bent inwardly for a short distance for a purpose to be described. The uprights are arranged in pairs, one member of a pair on each side of the conveyor, as is best seen in the exploded view of FIG. 3.

The lower ends of each pair of uprights support return idler rollers 6, these rollers having shafts 7 with flats 8 on each end which shafts can be assembled into and removed from the uprights 1 by the provision of somewhat keyhole-shaped slots 9 in the uprights into which the ends of the shafts are dropped. The return rollers extend across the greater part of the distance between the uprights. Alternatively the keyhole-shaped slots may be provided in adjustable plates 10 having elongated holes 11 which enable the plates to be shifted horizontally relative to the uprights whereby to assist in tracking the belt.

Crossbars 12, of somewhat greater width than central belt support rollers 13, are positioned above the return rollers in a manner to be described later. Each end of a crossbar is welded to a short upright 14 of flat steel, the upper end of each short upright having a cutout to form two ears 15, 16 at each end of the upright. Each ear is slotted to allow its upper edge to receive the flatted ends of rollers, and one ear 16 of each pair is bent inwardly.

The lower end of each short upright is bolted by bolts 17 to the upper vertical end 18 of a bracing member 19 of somewhat flattened S-shape, the opposite and lower end 20 of member 19 being directed vertically downwards and bolted to one of the main uprights 1 by bolts 21. The main or middle portion of the flattened S-shaped member 19 extends downwardly from the horizontal from the said upper end 18 to the said opposite and lower end 20.

The belt support roller 13 is held in the upright ears 15 on each of the short uprights on each side of the conveyor, the shaft of the roller having flattened ends 22 which slide into the slots in these upright ears.

A sheet metal member 23 is provided which acts as both a wind shield and a bearing member for the outer ends of wing rollers. It can be made in long lengths, for example of 60 feet or more. The windshield member on one side of the conveyor will be the mirror image of the member on the other side, and this description will therefore be restricted to the windshield member on the right-hand side of a conveyor. Also, a specific example will be described in which the wing roller is 9 inches long and 5 inches in diameter.

In section reading from the left, the windshield has a flange 24 about 1½ inches wide and making an angle of about 20° to the horizontal, with the inside edge being the lowest part, a lower upwardly extending vertical face 25 about 2½ inches wide, a base portion 26 about 12 inches wide and extending upwardly from the top of the said vertical face at an angle of 30°, this being also the angle the wing roller axis makes with the horizontal, a bracket portion 27 extending upwardly at right angles to the base portion and about 6 inches wide, an upper vertical face 28 extending upwardly for about 2½ inches, a horizontal outwardly extending flange 29 about 1½ wide, and a downturned lip 30.

The lower vertical face 25 has holes 31 by which the windshield is bolted between the upper end 18 of the flattened S-shaped bracing member 19 and the lower end of said short uprights 14. The bracket portion 27, adjacent its junction with the base portion, has holes which are bolted by bolts 32 to the inturned upper ends 5 of the trestle uprights 1. Accordingly, the wind shield is secured directly at one end to the uprights and at the other end indirectly, and also braces the components together, enabling longer spans between trestles.

Keyhole slots 33 are provided in the racket portion about 3½ inches above the base portion. The outside end of the shaft 34 of a wing roller 35 is inserted into the head of the slot, and the flats on the end of the shaft then slide into the narrower part of the slot simultaneously the flats 36 at the other end of the shaft slide down the slot in the inwardly inclined ear 16 of the short upright attached to the crossbar. Alternatively, and preferably, the slots 33 are oversize, and adjustable plates 37 are bolted by bolts 38 onto the bracket part, the plates having the keyhole slots for the flatted shafts of the wing rollers. As in the case of plates 10, the plates 37 have horizontally elongated mounting holes 39 which allow the plates to be moved relative to the brackets and thus assist in belt tracking.

It will be seen, therefore, that the sheet metal members 23 act both as a windshield, and as a bracket support or bearing for the outer ends of the wing roller shafts.

The base portion 26 also acts to direct any overflow from the edge of the belt away from the lower bearings and on to the return belt. Overflow droppings can then be returned on the lower belt scraped off at an arranged position and returned to the delivery side of the belt. Another protection can be provided by a protection shield (not shown) which is placed between the return idler rollers and below the lowest point of the windshield and which slopes downwardly toward the side of the conveyor. The overflow drops from the windshield onto this protection shield and is deflected outside the conveyor.

The horizontal surfaces 29 at the tops of the windshields on each side may be used as a runway for a servicing trolley or for transporting sections of conveyor.

Intermediate central and wing rollers 40, 41 (FIG. 1) may be provided at shorter intervals, e.g. 4 feet, and the shaft ends are then carried by the bracket portion 27 of the windshield and ears 15, 16 of plates 14 bolted directly to the vertical face 25 of the windshield.

Because of the configuration of the sheet steel windshield members 23 the uprights 1 can be spaced at intervals greater than 12 feet and up to 40 feet. With such greater spacings it is necessary to provide intermediate return idler rollers which are hung from the windshield members by additional vertical members.

I claim:

1. A belt conveyor of the type having center belt support rollers and wing rollers on each side of a center roller, said conveyor comprising a sheet steel member on each side of the conveyor, each sheet steel member acting as a windshield, supports on each sheet steel member for the outer ends of the shafts of the wing rollers, uprights which support the weight of the conveyor and its load, each windshield including a first portion secured to the uprights, crossbars joining second portions of the windshields on opposite sides of the conveyor, vertically extending plates secured to each crossbar at the ends thereof, each plate including two slotted ears, one of each pair of slotted ears being bent inwardly to act as a bearing for the inner end of the shaft of a wing roller.

2. A belt conveyor as claimed in claim 1, wherein each windshield member has an outwardly directed horizontal upper flange adapted to serve as a runway for a servicing trolley.

3. A belt conveyor as claimed in claim 1 wherein each windshield member has an inwardly and downwardly sloping inside flange.

4. A belt conveyor as claimed in claim 1 comprising bracing members having lower and outer ends secured to the uprights and upper and inner ends connected both to that portion of the windshield adjacent the inner bearings of the wing rollers and the crossbar.